US008693039B2

(12) United States Patent
Rizzo et al.

(10) Patent No.: US 8,693,039 B2
(45) Date of Patent: Apr. 8, 2014

(54) DYNAMIC PRINT MEDIA AVAILABILITY SYSTEM AND METHOD PROVIDING INFORMATION FOR PRINT JOB

(75) Inventors: Christopher R. Rizzo, Sherwood, OR (US); John A. Scriven, Oswego, OR (US); Ashutosh P. Sanzgiri, Portland, OR (US); Marvin M. Abe, Sherwood, OR (US); David R. Sponable, Keizer, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/466,711

(22) Filed: May 8, 2012

(65) Prior Publication Data

US 2013/0301076 A1 Nov. 14, 2013

(51) Int. Cl.
*G06F 3/12* (2006.01)

(52) U.S. Cl.
USPC ........................................... 358/1.15

(58) Field of Classification Search
None
See application file for complete search history.

(56) References Cited

U.S. PATENT DOCUMENTS

| | | | |
|---|---|---|---|
| 4,737,645 A | 4/1988 | Lahr | |
| 5,081,595 A | 1/1992 | Moreno et al. | |
| 5,699,494 A | 12/1997 | Colbert et al. | |
| 6,032,004 A | 2/2000 | Mirabella, Jr. et al. | |
| 6,088,120 A | 7/2000 | Shibusawa et al. | |
| 6,304,732 B1 | 10/2001 | Myers et al. | |
| 6,876,980 B2 | 4/2005 | Reid et al. | |
| 7,436,530 B2 | 10/2008 | Terrill et al. | |
| 7,626,717 B2 * | 12/2009 | Rai et al. | 358/1.15 |
| 8,488,175 B2 * | 7/2013 | Scaff | 358/1.15 |
| 2001/0051905 A1 * | 12/2001 | Lucas | 705/29 |
| 2002/0107753 A1 * | 8/2002 | Laughlin et al. | 705/26 |
| 2002/0186406 A1 | 12/2002 | Phillips et al. | |
| 2003/0071726 A1 * | 4/2003 | Hopper et al. | 340/540 |
| 2005/0002058 A1 * | 1/2005 | Hirabayashi | 358/1.15 |
| 2007/0019228 A1 * | 1/2007 | Rai et al. | 358/1.15 |
| 2007/0127058 A1 * | 6/2007 | Eldridge | 358/1.15 |
| 2008/0037064 A1 * | 2/2008 | Goetz et al. | 358/1.16 |

OTHER PUBLICATIONS

U.S. Appl. No. 40/737,645, filed Apr. 12, 1988, Lahr.

* cited by examiner

*Primary Examiner* — Jeremiah Bryar
(74) *Attorney, Agent, or Firm* — Gibb & Riley, LLC

(57) ABSTRACT

Methods and systems maintain print media stocking information. The print media stocking information comprises types and amounts of print media stored at a plurality of different physical locations. The different physical locations have printing devices and external storage locations. The print media is maintained within internal storage locations of the printing devices and within the external storage locations at the different physical locations. The external storage locations are outside the printing devices and positioned relative to the printing devices a distance to allow an operator to load the print media into the printing devices when instructed to do so. The methods and systems receive a print job from a user. In response to receiving the print job, the methods and systems output to the user the types and amounts of media available at the different physical locations that correspond to print job media required for the print job.

20 Claims, 4 Drawing Sheets

DYNAMIC PRINT MEDIA AVAILABILITY SYSTEM AND METHOD PROVIDING INFORMATION FOR PRINT JOB

BACKGROUND

Embodiments herein generally relate to printing systems and more particularly to methods and systems that manage and utilize print media at different physical locations.

Whenever a user desires to print something, that user needs to know if the size, type, color, letterhead, emboss, etc., (including cost, or other attribute) of the media to print on is available. Most marking devices provide this information either locally at the user interface (UI), or remotely via a print driver or web page served by the device itself. In general, the information provided is only information on the media currently present in the printing device itself. Many devices also provide information on their capabilities, even if the media they are capable of marking on is not currently installed in the device.

SUMMARY

Various exemplary methods herein (which can be executed using non-transitory storage mediums storing instructions executable by computerized devices) maintain print media stocking information in the computer-readable non-transitory storage device (that is operatively connected to (directly or indirectly connected to) a plurality of computerized devices). Such computerized devices can include, for example, print servers and printing devices.

The "print media stocking information" comprises types and amounts of print media stored at various different physical locations and can include attributes such as cost, size, color, letterhead, logos, forms, embossing, etc. The different physical locations have at least one of the printing devices and have external storage locations. The print media is maintained within internal storage locations of the printing devices at the different physical locations and within the external storage locations at the different physical locations. The external storage locations are outside the printing devices, but are positioned relative to the printing devices a distance to allow an operator to load the print media into the printing devices when instructed to do so.

The methods receive a print request from a user into one of the computerized devices. The methods, in response to receiving the print request, evaluate the print request to determine the required types and amounts of print media that the print request requires, using the computerized devices. Next, such methods determine, from the print media stocking information, whether the required types and amounts of print media are available at the different physical locations to produce physical location specific print media availability corresponding to the requirements of the print request (using the computerized devices). Then such methods can output, to the user from the one of the computerized devices, the physical location specific print media availability corresponding to the requirements of the print request.

Other exemplary methods herein (which can also be executed using non-transitory storage mediums storing instructions executable by computerized devices) similarly maintain print media stocking information in the computer-readable non-transitory storage device (that is operatively connected to various computerized devices). The computerized devices can include, print servers and printing devices. The print media stocking information comprises types and amounts of print media stored at various different physical locations. The different physical locations have at least one of the printing device and have external storage locations. The print media is maintained within internal storage locations of the printing devices at the different physical locations and within the external storage locations at the different physical locations. Again, the external storage locations are outside the printing devices, but are positioned relative to the printing devices a distance to allow an operator to load the print media into the printing devices when instructed to do so.

The methods receive a print request from a user into one of the computerized devices. The methods, in response to receiving the print request, evaluate the print request to determine the required types and amounts of print media based on the requirement of the print request, using the computerized devices. Next, such methods determine, from the print media stocking information, whether the required types and amounts of print media are available at the different physical locations to produce physical location specific print media availability corresponding to the requirements of the print request (using the computerized devices). Then such methods can output, to the user from the one of the computerized devices, the physical location specific print media availability corresponding to the requirements of the print request.

The methods also receive, into the one of the computerized devices from the user, a selected physical location of the different physical locations to execute the print request (either from the user, or from the print request itself). When the print request media required to execute the print request is not within the internal storage locations of printing devices at the selected physical location, the methods cause one of the computerized devices to instruct the operator to load the print request media from a corresponding one of the external storage locations into a corresponding one of the printing devices at the selected physical location. Additionally, such methods can output an "insufficient print media" message from one of the computerized devices to the user when the print request specifies one of the different physical locations in which the internal storage locations and the external storage locations do not contain sufficient amounts of the print media to complete the print request.

Such computerized devices communicate with each other and with the printing devices over a computerized network. When maintaining the print media stocking information the methods herein track (and/or estimate) the types and amounts of print media actually delivered to, and actually used by the printing devices at each of the different physical locations.

Exemplary system embodiments herein include computerized devices located at different physical locations. The computerized devices can include print servers, printing devices, personal computers, etc. The systems also include at least one computer-readable non-transitory storage device operatively connected to such computerized devices.

As detailed above, the computer-readable non-transitory storage device maintains print media stocking information, the print media stocking information comprises types and amounts of print media stored at the plurality of different physical locations. Further, the different physical locations have at least one printing device and have external storage locations. The print media is maintained within internal storage locations of the printing devices at the different physical locations and is maintained within the external storage locations at the different physical locations. The external storage locations are outside the printing devices, but are positioned (relative to the printing devices) a distance to allow an operator to load the print media into the printing devices when instructed to do so.

Again, in response to receiving the print request, one of the computerized devices evaluates the print request to determine the required types and amounts of print media based on the requirement of the print request. Next, such systems determine, from the print media stocking information, whether the required types and amounts of print media are available at the different physical locations to produce physical location specific print media availability corresponding to the requirements of the print request (using the computerized devices). Then such systems can output, to the user from the one of the computerized devices, the physical location specific print media availability corresponding to the requirements of the print request.

Additionally, one of the computerized devices can receive, from the user, a selected physical location of the different physical locations to execute the print request. When the print request media required to execute the print request is not within the internal storage locations of printing devices at the selected physical location, one of the computerized devices instructs the operator to load the print request media from a corresponding one of the external storage locations into a corresponding one of the printing devices at the selected physical location.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Information on the media currently present in a printing device and on a specific printer's capabilities is available in conventional systems. Typically, devices report information on the media currently installed, or the media they are capable of supporting. This information does not help in identifying what marking requests can actually be satisfied, based on the media that is actually available to be printed on at the site (at a specific physical location). In view of this, the present disclosure provides methods and systems by which the user of a device can know if the media that is desired is actually available for marking (even if it is not installed in the device) in conjunction with a specific printer's media capabilities.

In this way, a user can submit a print job that uses a non-installed media, knowing that the media is available to be loaded into the printers at the location selected by the user. This allows the user to either go to the device and install the uninstalled media, or have an operator install it to allow the marking job to complete.

Figure 1:
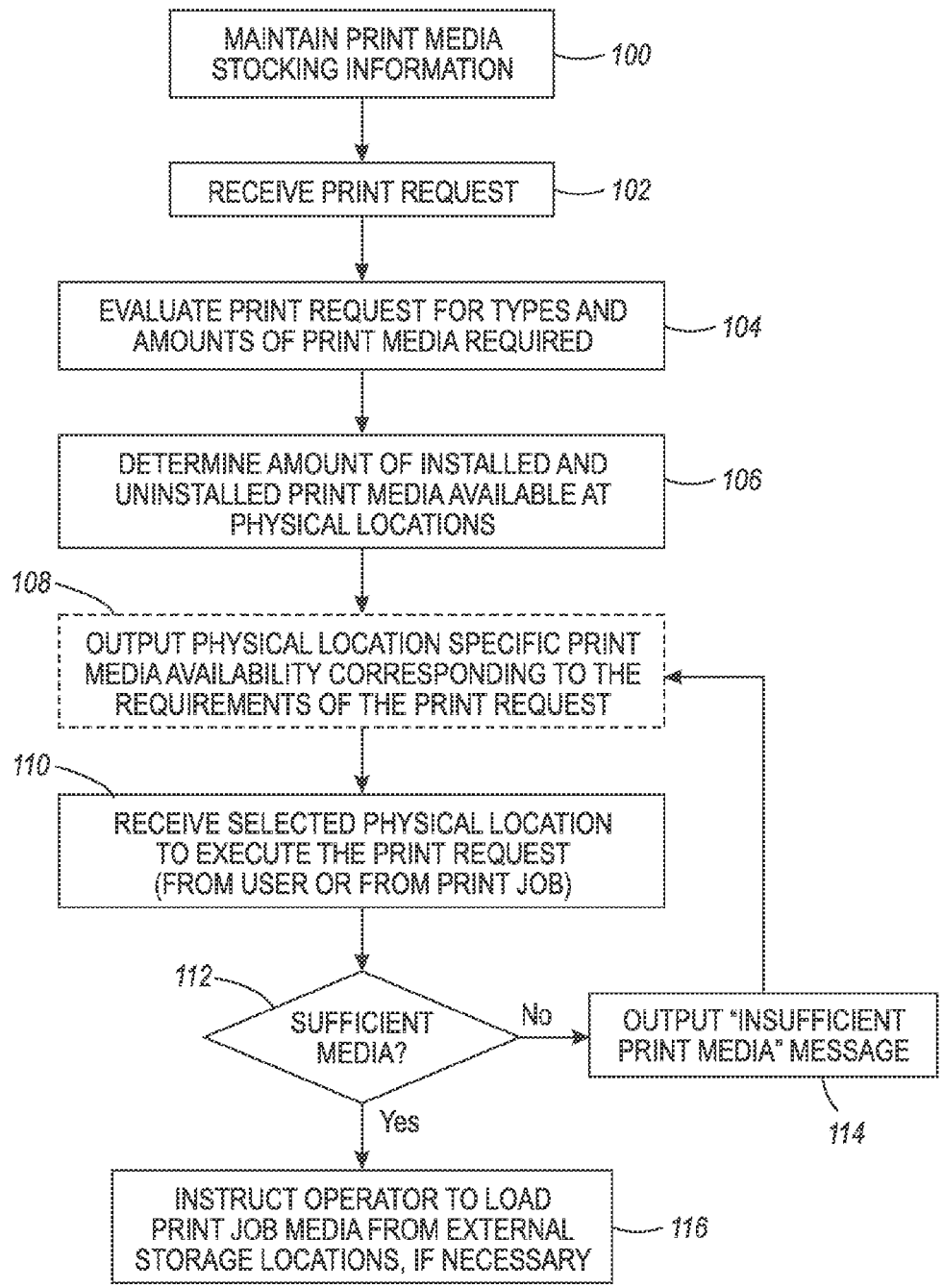
FIG. 1 is a flow diagram of illustrating methods according to embodiments herein.

FIG. 1 is flowchart illustrating exemplary methods herein (which can be executed using non-transitory storage mediums (such as those discussed below) storing instructions executable by computerized devices). Beginning in item 100, exemplary methods herein maintain print media stocking information in the computer-readable non-transitory storage device (that is operatively connected to one or more computerized devices). The computerized devices can include, print servers, printing devices, personal computers, etc. The "print media stocking information" comprises types and amounts of print media stored at various different physical locations and can include attributes such as cost, size, color, letterhead, logos, forms, embossing, etc. When maintaining the print media stocking information the methods herein track (and/or estimate) the types and amounts of print media actually delivered to and actually used by the printing devices at each of the different physical locations.

Therefore, each shipment of print media to a specific location, and each sheet of media used can be tracked (manually, or by automated inventory control systems operatively connected to the computerized devices discussed herein) and periodic manual inventory counts can be performed to provide actual tracking of the print media. Further, averages of usage for each location can be tracked over time using historical information to estimate or predict what print media is (or will be) present at a specific location. Combinations of such actual tracking and estimating can also be used to determine the print media stocking information.

The different physical locations each have at least one of the printing devices and have at least one external storage location. Such computerized devices can communicate with each other and with the printing devices over a computerized network. The print media is maintained within internal storage locations of the printing devices at the different physical locations and within the external storage locations at the different physical locations.

The external storage locations are outside the printing devices, but are positioned relative to the printing devices a distance to allow an operator to load the print media into the printing devices when instructed to do so. For example, systems and methods herein can maintain requirements so that the external storage locations must be within prescribed physical distances (e.g., 5 meters, 10 meters, 50 meters, etc.) of the printing devices. Alternatively, requirements can be maintained so that the external storage locations must be a distance that allows the operator to retrieve and load the uninstalled (but required by the print job) print media into the printing device within a prescribed time period (e.g., 5 minutes, 15 minutes, 1 hour, 1 day, etc.) or to retrieve and load the uninstalled print media in time to comply with a delivery date and time (which can potentially also be specified by the print job).

The method steps described in, for example, items 102-114 below can be preformed at any point in the printing process, such as by a print driver while a user is preparing a print job for printing. In item 102, the methods receive a print request from a user into one of the computerized devices. This print request can be a complete print job, or can be the initial step in the process of setting up a print job through a print driver. The methods, in response to receiving the print request in item 104, evaluate the print request to determine the required types and amounts of print media based on the requirement of the print request, using the computerized devices. Next, in item 106, such methods determine, from the print media stocking information, whether the required types and amounts of print media are available at the different physical locations to produce physical location specific print media availability corresponding to the requirements of the print request (using the computerized devices).

Then, in item 108, such methods can optionally output to the user from the one of the computerized devices (by for example displaying information on a graphic user interface) the physical location specific print media availability corresponding to the requirements of the print request. Item 108 is shown using dashed lines in FIG. 1 to illustrate that it is an optional step, as the print request itself may automatically indicate a location preference (or may indicate a preferred order of location preferences specifying the order in which attempts to complete the print request should be made when automatically evaluating a print request's requirements across many different potential printing locations).

The methods also receive, into the one of the computerized devices from the user or the print job itself in item 110, a selected physical location (from the different physical locations) to execute the print request. In item 112, such methods determine if sufficient amounts of the print media to complete the print request are available at the selected physical location. If not, in item 114 such methods output (display) an "insufficient print media" message from one of the computerized devices to the user when the user or the print request specifies a physical location in which the internal storage locations and the external storage locations do not contain sufficient amounts of the print media to complete the print request. If there are not amounts of print media to complete the print request, processing then returns to item 108 to optionally allow the user to manually select a different location, or to allow the print request to automatically select a different location by progressing down such a preferred order of location preferences.

Once the appropriate physical location is selected (a location that has sufficient amounts of the print media to complete the print job), but the print request media required to execute the print job is not within the internal storage locations of printing devices at the selected physical location, in item 116, the methods cause one of the computerized devices to instruct the operator to load the print request media from a corresponding one of the external storage locations into a corresponding one of the printing devices at the selected physical location.

Figure 2:
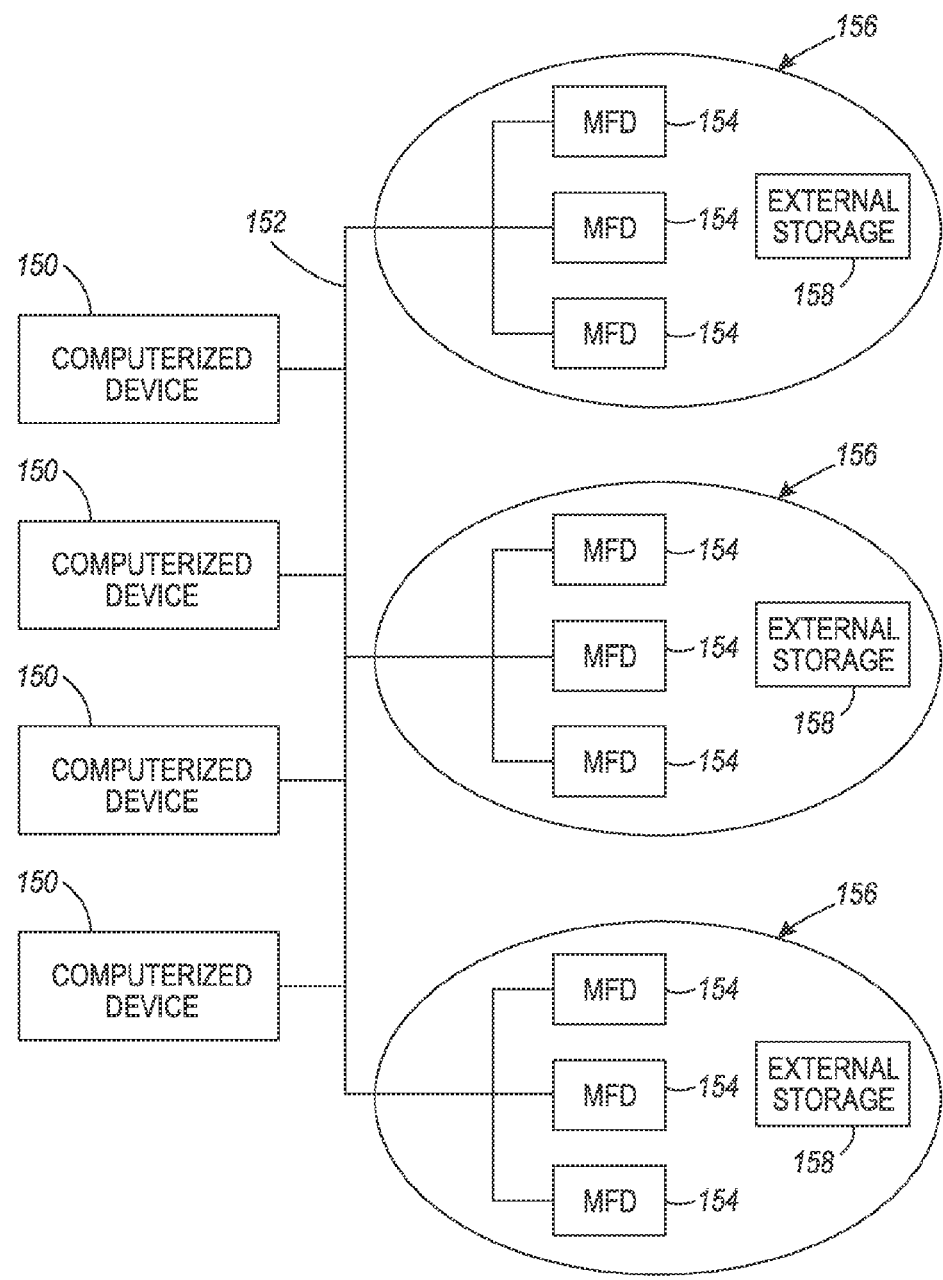
FIG. 2 is a schematic diagram of a system according to embodiments herein.

As shown in FIG. 2, exemplary system embodiments herein include various computerized devices 150, 154 located at various different physical locations 156. The computerized devices 150, 154 can include print servers, printing devices, personal computers, etc. Further, the different physical locations 156 have at least one computerized printing devices 154 and have at least one external storage location 158. The external storage locations 158 are outside the printing devices and are positioned (relative to the printing devices) a distance to allow an operator to load the print media into the printing devices 154 when instructed to do so.

Figure 3:
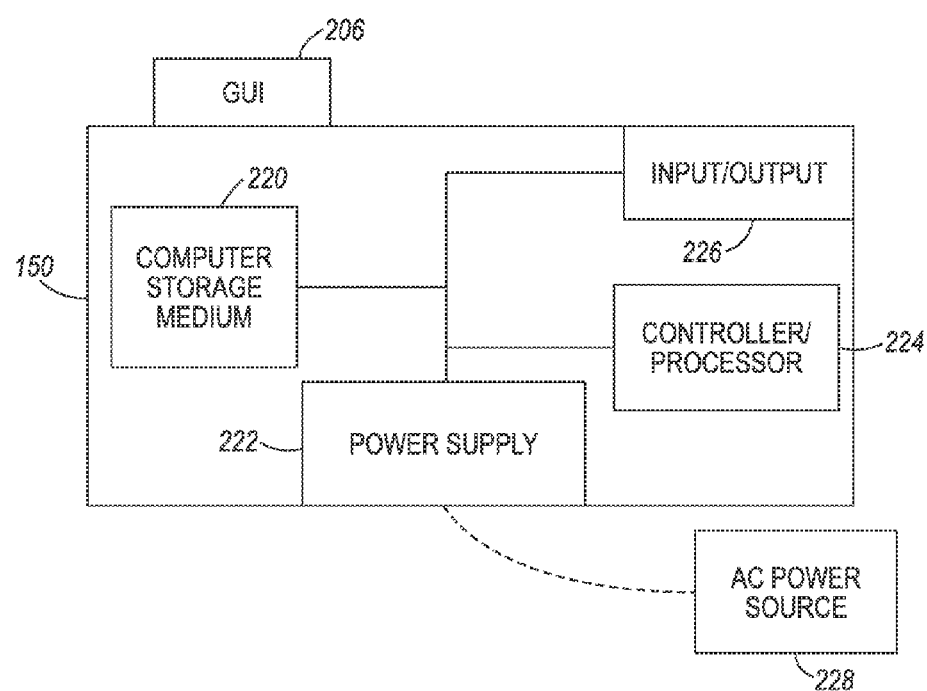
FIG. 3 is a side-view schematic diagram of a device according to embodiments herein.

FIG. 3 illustrates a computerized device 150, which can be used with embodiments herein and can comprise, for example, a print server, a personal computer, a portable computing device, etc. The computerized device 150 includes a controller/processor 224 and a communications port (input/output) 226 operatively connected to the processor 224 and to a computerized network 152 external to the computerized device 150. Also, the computerized device 150 can include at least one accessory functional component, such as a graphic user interface assembly 206 that also operate on the power supplied from the external power source 228 (through the power supply 222).

The input/output device 226 is used for communications to and from the computerized device 150. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 3, a body housing 150 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 4:
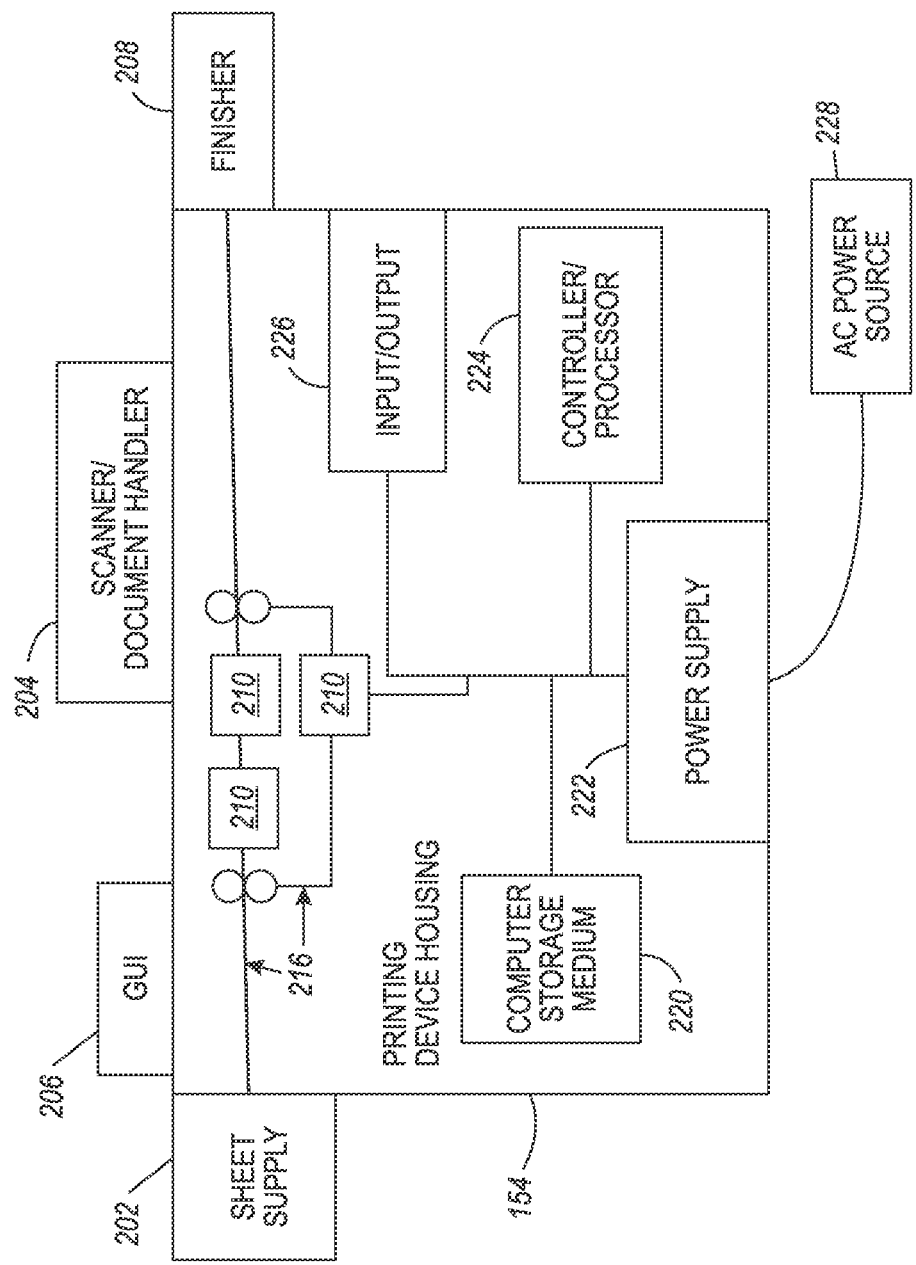
FIG. 4 is a side-view schematic diagram of a device according to embodiments herein.

FIG. 4 illustrates a computerized device that is a printing device 154, which can be used with embodiments herein and can comprise, for example, a printer, copier, multi-function machine, multi-function device (MDF), etc. The printing device 154 includes many of the components mentioned above and at least one marking device (printing engines) 210 operatively connected to the processor 224, a media path 216 positioned to supply sheets of media from a sheet supply 202 to the marking device(s) 210, etc. After receiving various markings from the printing engine(s), the sheets of media can optionally pass to a finisher 208 which can fold, staple, sort, etc., the various printed sheets. Also, the printing device 154 can include at least one accessory functional component (such as a scanner/document handler 204, sheet supply 202, finisher 208, etc.) that also operate on the power supplied from the external power source 228 (through the power supply 222).

As detailed above, the computer-readable non-transitory storage device 220 maintains print media stocking information, and the print media stocking information comprises types and amounts of print media stored at the plurality of different physical locations 156. The print media is maintained within internal storage locations 202 of the printing devices 154 at the different physical locations 156 and is maintained within the external storage locations 158 at the different physical locations 156.

Again, in response to receiving the print request, one of the computerized devices 150, 154 evaluates the print request to determine the required types and amounts of print media based on the requirement of the print request. Next, such systems determine, from the print media stocking information, whether the required types and amounts of print media are available at the different physical locations 156 to produce physical location specific print media availability corresponding to the requirements of the print request (using the computerized devices 150, 154). Then such systems can output, to the user from the one of the computerized devices 150, 154, the physical location specific print media availability corresponding to the requirements of the print request.

Additionally, one of the computerized devices 150, 154 can receive, from the user or print request, a selected physical location of the different physical locations 156 to execute the print request. When the print request media required to execute the print request is not within the internal storage locations 202 of printing devices 154 at the selected physical location, one of the computerized devices 150, 154 instructs the operator to load the print request media from a corresponding one of the external storage locations 158 into a corresponding one of the printing devices 154 at the selected physical location.

Thus, as shown above, with systems and methods herein a media availability database is built and maintained using various pieces of information and processes including the amount and type of media that is currently installed (as determined manually or automatically by the printing device), manual entry by the administrator or key operator regarding media that is present on site via an user interface, memory of media that has been installed in the device in the past, etc.

In one example, when a printing device is initially shipped to the customer and installed, the media that is initially installed populates the media availability database with its initial data. A local or remote user interface is provided by the device to allow the administrator or key operator to enter other available media. As new and different media is installed and used, the media availability database is updated to include that media. The media availability database can be stored either locally on each printing device, remotely on a server thru separate software, and even shared between devices that implement the similar media availability functionality.

Thus, the device that does the marking maintains a history of the media that is installed or has been installed (previously used). In this way each printing device builds up a media availability database and shares this information with other printing devices (and potentially with print servers or other computerized devices). If media that has been used in the past is no longer available, a means exists for an administrator or operator to delete that media from the database. An administrator or operator adds and removes media availability information via the device's local user interface, or a remote user interface (such as a web page served by the device), etc.

Thus, the systems and methods herein allow submitters/creators of print jobs/requests to know whether a specific media they would like their print jobs to be marked on is available at the site to support their request, allow submitters/creators of print jobs/requests to peruse the available media including images of available graphic letterheads, logos, forms, embossing, etc., to aid in creation of documents, prevent a request that cannot be satisfied, given the media availability (or lack thereof) at the site, and track the usage of each type media to provide information on the need to replenish media supply before it runs out.

The individual who submits a marking request to the device typically uses an application that interfaces with a printer driver to send the job to the device over a network or local physical connection. The print driver retrieves media availability information by communicating with the device using well-known protocols such as simple network management protocol (SNMP), internet printing protocol (IPP), Web Services protocol, etc. When an end user wants to print a job, with the systems and methods herein, the driver can not only present the option of using installed media, but also media available that is not installed, to allow the user to select media that they know is available. In the same regard, the driver can prevent the selection of media that is not available internally within a printer or externally at the site, and for which a request cannot be satisfied.

The following scenarios illustrate some possibilities for storage location and data harvesting for the construction of the media availability database, including the use of several devices and a server. However, those ordinarily skilled in the art would understand that the following is a non-exhaustive list and that other possibilities abound. For example, the marking (printing) device itself can maintain the database internally. The device administrator or operator enters media availability information at the local or remote (i.e., Web UI) of the marking device. The printing device itself updates the availability database based on media that is installed.

In another example, a marking device can support a cloning method thru which other marking devices (with support for the same media availability functionality) can share the availability database and create a superset of the data from each of the individual devices. In this way the media availability database can be built quickly as many devices are used for different printing jobs across the site. Cloning can be performed through direct network transfer of the data from one device to another, universal serial bus (USB) media transfer or some other means of transferring the data.

In an additional example, a computer/server on the network can have media availability software installed that communicates with all marking devices to build the media availability database, to allow administrator or operator manual entry, and to transfer the media availability information to each of the supporting devices at regular intervals to keep the information in them up to date. Thus, the database can be built by printing devices "pushing" their information to the server or the server "pulling" the information from devices over the network, as well as the administrator or operator updating the available media information at some user interface on the server.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
maintaining print media stocking information in at least one computer-readable non-transitory storage device operatively connected to a plurality of computerized devices, said computerized devices including printing devices, said print media stocking information comprising types and amounts of print media stored at a plurality of different physical locations, each of said different physical locations has at least one of said printing devices and has external storage locations, said print media being maintained within internal storage locations of said printing devices at said different physical locations and within said external storage locations at said different physical locations, and said external storage locations being outside said printing devices and positioned relative to said printing devices a distance to allow an operator to load said print media into said printing devices when instructed to do so;
receiving a print job from a user into one of said computerized devices;
in response to said receiving of said print job, evaluating said print job to determine required types and amounts of print media based on requirements of said print job, using said computerized devices;
determining, from the print media stocking information, whether said required types and amounts of print media are available at said different physical locations to produce physical location specific print media availability corresponding to said requirements of said print job, using said computerized devices; and
outputting, to said user from said one of said computerized devices, said physical location specific print media availability corresponding to said requirements of said print job.

2. The method according to claim 1, further comprising outputting an insufficient print media message from said one of said computerized devices to said user when said print job specifies at least one of said different physical locations in which said internal storage locations and said external storage locations do not contain sufficient amounts of said print media to complete said print job.

3. The method according to claim 1, said maintaining of said print media stocking information comprising tracking said types and amounts of print media actually delivered to and actually used by said printing devices at each of said different physical locations.

4. The method according to claim 1, said maintaining of said print media stocking information comprising estimating said types and amounts of print media delivered to and used by said printing devices at each of said different physical locations.

5. The method according to claim 1, said computerized devices communicating with each other and with said printing devices over a computerized network.

6. A method comprising:
maintaining print media stocking information in at least one computer-readable non-transitory storage device operatively connected to a plurality of computerized devices, said computerized devices including printing devices, said print media stocking information comprising types and amounts of print media stored at a plurality of different physical locations, each of said different physical locations has at least one of said printing devices and has external storage locations, said print media being maintained within internal storage locations of said printing devices at said different physical locations and within said external storage locations at said different physical locations, and said external storage locations being outside said printing devices and positioned relative to said printing devices a distance to allow an operator to load said print media into said printing devices when instructed to do so;
receiving a print job from a user into one of said computerized devices;
in response to said receiving of said print job, evaluating said print job to determine required types and amounts of print media based on requirements of said print job, using said computerized devices;
determining, from the print media stocking information, whether said required types and amounts of print media are available at said different physical locations to produce physical location specific print media availability corresponding to said requirements of said print job, using said computerized devices;
outputting, to said user from said one of said computerized devices, said physical location specific print media availability corresponding to said requirements of said print job;
receiving, from said user into said one of said computerized devices, a selected physical location of said different physical locations to execute said print job; and
when said print media required to execute said print job is not within said internal storage locations of printing devices at said selected physical location, one of said computerized devices instructing said operator to load said print media from a corresponding one of said external storage locations into a corresponding one of said printing devices at said selected physical location.

7. The method according to claim 6, further comprising outputting an insufficient print media message from said one of said computerized devices to said user when said print job specifies at least one of said different physical locations in which said internal storage locations and said external storage locations do not contain sufficient amounts of said print media to complete said print job.

8. The method according to claim 6, said maintaining of said print media stocking information comprising tracking said types and amounts of print media actually delivered to and actually used by said printing devices at each of said different physical locations.

9. The method according to claim 6, said maintaining of said print media stocking information comprising estimating said types and amounts of print media delivered to and used by said printing devices at each of said different physical locations.

10. The method according to claim 6, said computerized devices communicating with each other and with said printing devices over a computerized network.

11. A system comprising:
a plurality of computerized devices located at a plurality of different physical locations, said computerized devices including printing devices; and
at least one computer-readable non-transitory storage device operatively connected to said computerized devices,
said computer-readable non-transitory storage device maintaining print media stocking information,
said print media stocking information comprising types and amounts of print media stored at said plurality of different physical locations,
each of said different physical locations have at least one of a plurality of printing devices and have external storage locations, said print media being maintained within internal storage locations of said printing devices at said different physical locations and within said external storage locations at said different physical locations, said external storage locations being outside said printing devices and positioned relative to said printing devices a distance to allow an operator to load said print media into said printing devices when instructed to do so, in response to one of said computerized devices receiving a print job from a user, one of said computerized devices determines required types and amounts of print media based on requirements of said print job, one of said computerized devices determining, from the print media stocking information, whether said required types and amounts of print media are available at said different physical locations to produce physical location specific print media availability corresponding to said requirements of said print job, using said computerized devices, one of said computerized devices outputting, to said user, said physical location specific print media availability corresponding to said requirements of said print job, said one of said computerized devices receiving, from said user, a selected physical location of said different physical locations to execute said print job, and when said print media required to execute said print job is not within said internal storage locations of printing devices at said selected physical location, one of said computerized devices instructs said operator to load said print media from a corresponding one of said external storage locations into a corresponding one of said printing devices at said selected physical location.

12. The system according to claim 11, further comprising outputting an insufficient print media message from said one of said computerized devices to said user when said print job specifies at least one of said different physical locations in which said internal storage locations and said external storage locations do not contain sufficient amounts of said print media to complete said print job.

13. The system according to claim 11, said maintaining of said print media stocking information comprising tracking said types and amounts of print media actually delivered to and actually used by said printing devices at each of said different physical locations.

14. The system according to claim 11, said maintaining of said print media stocking information comprising estimating said types and amounts of print media delivered to and used by said printing devices at each of said different physical locations.

15. The system according to claim 11, said computerized devices communicating with each other and with said printing devices over a computerized network.

16. A non-transitory computer storage medium readable by a computerized device, said non-transitory computer storage medium storing instructions executable by said computerized device to perform a method comprising:

maintaining print media stocking information, said print media stocking information comprising types and amounts of print media stored at a plurality of different physical locations, each of said different physical locations has at least one of a plurality of printing devices and has external storage locations, said print media being maintained within internal storage locations of said printing devices at said different physical locations and within said external storage locations at said different physical locations, and said external storage locations being outside said printing devices and positioned relative to said printing devices a distance to allow an operator to load said print media into said printing devices when instructed to do so;

receiving a print job from a user;

in response to said receiving of said print job, evaluating said print job to determine required types and amounts of print media based on requirements of said print job;

determining, from the print media stocking information, whether said required types and amounts of print media are available at said different physical locations to produce physical location specific print media availability corresponding to said requirements of said print job;

outputting, to said user, said physical location specific print media availability corresponding to said requirements of said print job;

receiving, from said user, a selected physical location of said different physical locations to execute said print job; and when said print media required to execute said print job is not within said internal storage locations of printing devices at said selected physical location, instructing said operator to load said print media from a corresponding one of said external storage locations into a corresponding one of said printing devices at said selected physical location.

17. The non-transitory computer storage medium according to claim 16, further comprising outputting an insufficient print media message to said user when said print job specifies at least one of said different physical locations in which said internal storage locations and said external storage locations do not contain sufficient amounts of said print media to complete said print job.

18. The non-transitory computer storage medium according to claim 16, said maintaining of said print media stocking information comprising tracking said types and amounts of print media actually delivered to and actually used by said printing devices at each of said different physical locations.

19. The non-transitory computer storage medium according to claim 16, said maintaining of said print media stocking information comprising estimating said types and amounts of print media delivered to and used by said printing devices at each of said different physical locations.

20. The non-transitory computer storage medium according to claim 16, said method further comprising computerized devices communicating with each other and with said printing devices over a computerized network.

* * * * *